United States Patent [19]
Albers et al.

[11] Patent Number: 5,020,588
[45] Date of Patent: Jun. 4, 1991

[54] METHOD AND APPARATUS FOR SIMULTANEOUS HEAT AND MASS TRANSFER UTILIZING A PLURALITY OF GAS STREAMS

[75] Inventors: Walter F. Albers, 2626 E. Arizona Biltmore Cir., #23, Phoenix, Ariz. 85016; James R. Beckman, Tempe, Ariz.

[73] Assignee: Walter F. Albers, Phoenix, Ariz.

[21] Appl. No.: 347,159

[22] Filed: May 3, 1989

[51] Int. Cl.$^5$ ............................ F28D 3/04; F28F 13/02
[52] U.S. Cl. ................................. 165/111; 165/115; 261/22; 261/23.1; 261/153
[58] Field of Search ............... 165/104.31, 109.1, 111, 165/908, 115; 261/22, 23.1, 153

[56] References Cited
U.S. PATENT DOCUMENTS

| | | | |
|---|---|---|---|
| 2,430,890 | 11/1947 | Schneible | 261/147 |
| 4,832,115 | 5/1989 | Albers et al. | 165/104.31 |

*Primary Examiner*—Albert W. Davis, Jr.
*Attorney, Agent, or Firm*—William W. Holloway

[57] ABSTRACT

Method and apparatus for heat and mass transfer are described that is applicable to: concentration, crystallization, purification, fractionation, stripping, absorption, and/or heat exchange for liquid media; and temperature and humidity modification for gas media. Using a plurality of moving gas streams, comprised for example of air, at constant and generally atmospheric pressures, a continual change in a vapor-liquid equilibrium of the gas streams is created between proximate but continually changing gas and liquid temperatures within each of a plurality of heat exchange chambers. Chamber wetting, implemented segmentedly, allows mass transfer into and out of the gas streams. A forced temperature differential between chambers, caused by different temperatures of the gas streams entering the chambers or by humidity modification of these gas streams within chambers, causes heat transfer between chambers through thermally conductive partitions. This transfer permits condensation of one side of a partition to enhance evaporation on a second side of a partition. The segmented wetting can further allow wetting substance concentrations caused by evaporation, selective condensation, or absorption to vary between wetted sectors. A migratory movement of liquids connecting these wetted sectors generally provides for development of applicable concentration gradients between the wetted sectors along chamber lengths.

9 Claims, 2 Drawing Sheets

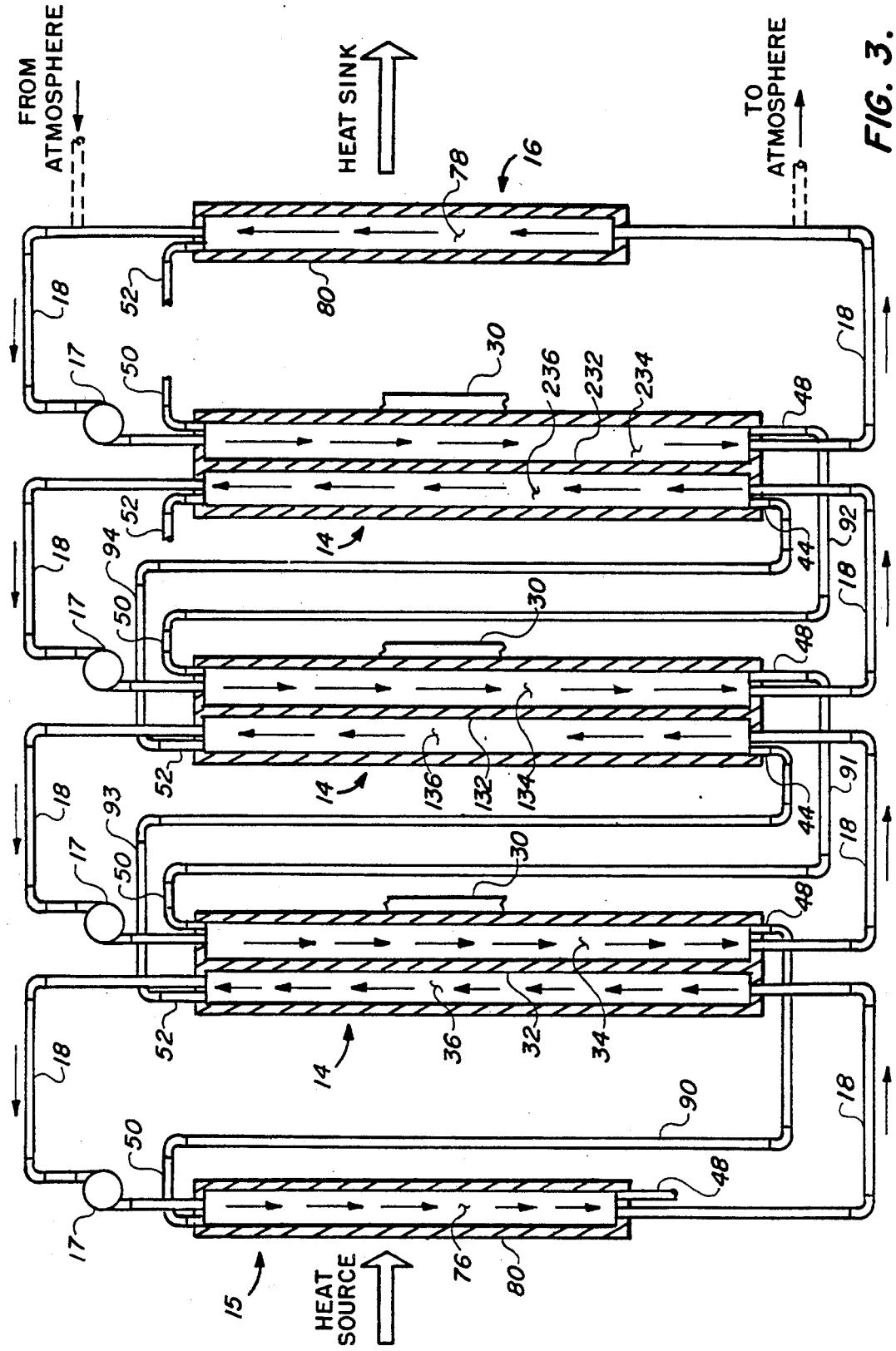

METHOD AND APPARATUS FOR SIMULTANEOUS HEAT AND MASS TRANSFER UTILIZING A PLURALITY OF GAS STREAMS

RELATED U.S. PATENT

U.S. Pat. No. 4,832,115, issued on May 23, 1989, entitled METHOD AND APPARATUS FOR SIMULTANEOUS HEAT AND MASS TRANSFER and invented by Walter F. Albers and James R. Beckman, is a related U.S. Patent.

FIELD OF THE INVENTION

The present invention relates to a method of heat transfer and mass transfer. As used herein, heat transfer is the movement of energy that heats or cools a fluid (liquid or gas), or evaporates a liquid or condenses a vapor that involves a gas/liquid interface. Mass transfer is the movement of an evaporating liquid from the liquid phase into the gas phase or movement of the condensing vapor from the gas phase into the liquid phase.

SUMMARY OF THE INVENTION

The present invention employs a plurality of gas streams where the gases are generally defined as non-condensing vapors or gases, which in most cases are implemented using ambient air. A first gas stream flows through a first chamber and a second gas stream flows through a second chamber, the chambers being thermally connected. Thermally connected, in this context, means that fluids (gas and/or liquid) from each chamber are brought into mutual close proximity on opposite sides of a heat transferring partition so that heat can be transferred between the first chamber and the second chamber. In passing through the chambers, the gases generally operate under nearly constant pressure, a small pressure differential being provided for overcoming frictional losses. The temperature of a gas entering the first chamber is different from the gas exiting from the second chamber because of differing temperatures of gas streams entering each chamber or because of humidity modification, within the chambers, of gas streams entering the chambers. This temperature difference causes a temperature differential to be created and maintained for these gases generally from one end of a chamber to the other. These temperature differentials cause the gases to approach a vapor-liquid equilibrium value and are thus receptive to receiving or losing vapors. An equilibrium value is a vapor-liquid equilibrium concentration or a vapor-liquid equilibrium temperature. A vapor-liquid equilibrium exists when the escape tendency of the species from a liquid phase to a vapor phase is exactly balanced with the escape tendency of that species from a vapor phase to enter a liquid phase at the same temperature and pressure.

Wetting substances are applied to part or to all of both chambers. The wetting substance is a liquid and is generally inert. In some cases, the wetting substance can be reactive, meaning that its molecules may be chemically combined with each other or with the gas. This wetting application is segmented, which means: (1) that the chamber is segmented along its length into sequential sectors that may be equal or unequal in length; (2) that uncontrolled mixing of wetting substances is minimized between sectors; (3) that the wetted sectors of the first and second chambers are sequentially ordered so that heat transfer between the first and the second chambers will occur in a manner so as to continually change the temperatures of the segmented wetting substances in one direction along the chamber lengths; and (4) that while wetting a sector, the sector also including its heat exchanging partition area, the bulk of the wetting substances remain within a sector for a required time duration for: (a) their temperature to follow the temperature of the gas within that sector, and/or to follow the temperature of another segmented wetting of a second chamber sector thermally connected to the first chamber sector, and/or to follow the temperature of the gas thermally connected to that chamber sector; and (b) a predetermined level of evaporation or condensation to occur into or from any present gas stream as induced by the vapor-liquid equilibrium imbalance associated with the gas of the gas stream and the wetting substance.

Migratory movement of the wetting substances for a plurality of sectors can be provided. Migratory movement means: (1) the actual movement of the wetting substances into and out of a sector where the wetting substance, when exiting a wetted sector, has at least one selected property that is different from the same selected property when the wetting substance entered the wetted sector, wherein a selected property is the temperature or the concentration of a wetting substance; and (2) that some portion of the wetting substances of a wetting sector exits that sector to enter an adjacent wetting sector. This migratory movement between sectors allows a wetting substance property of one sector to influence the same property of an adjacent sector, this sequence being repeated throughout a plurality of wetted sectors to obtain at least one overall directional movement of these wetting substances combined with sequential change in at least one selected property. Migratory movement rate is controlled by addition to or subtraction from the chamber at different locations in the chamber by any means to achieve the required time duration of the wetting substance within a wetting sector.

In operation, where evaporation from these wetting substances into the gas stream or selective condensation from this gas stream is present, segmented wetting coupled with migratory movement provides the following occurrences. First, because a sector is wetted by primarily the same wetting substances, the now localized wetting substance properties can be forced to change. Second, because the migratory movement is from one sector to another, the concentration of one sector influences the wetting substance composition of the subsequent sector, wherein the wetting substance composition again may be altered by evaporation or condensation. In this manner, selected substance property gradients can be developed and maintained throughout the chamber length.

The first and second chambers hereto described form a chamber pair. One chamber pair generally causes evaporation in one chamber into its gas stream and condensation in the other chamber from its gas stream. The energy lost by the condensing chamber is approximately equal to the energy gained by the evaporating chamber. In order to reuse the energy of the evaporating chamber gas stream, that gas stream can be introduced into the condensing chamber of another chamber pair. In this manner the energy of the initial condensing chamber gas stream can be reused many times by multiply connecting chamber pairs and gas streams.

These and other features of the present invention will be understood upon reading of the following description along with the Figures.

BRIEF DESCRIPTION OF THE DRAWINGS

FIG. 3 is a plan view, with portions broken away, of a multiply connected group of devices of the present invention with an auxiliary heat exchanger unit, optional supplemental gas cooler, and gas movement shown schematically.

DETAILED DESCRIPTION OF THE PREFERRED EMBODIMENT

Figure 2:
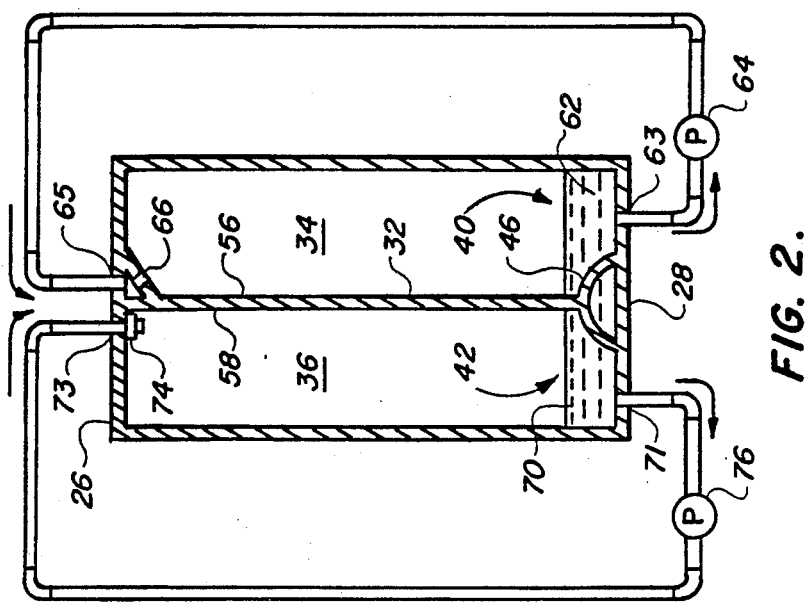
FIG. 2 is a cross-sectional view taken along line 2—2 of FIG. 1 with portions shown schematically.
Figure 1:
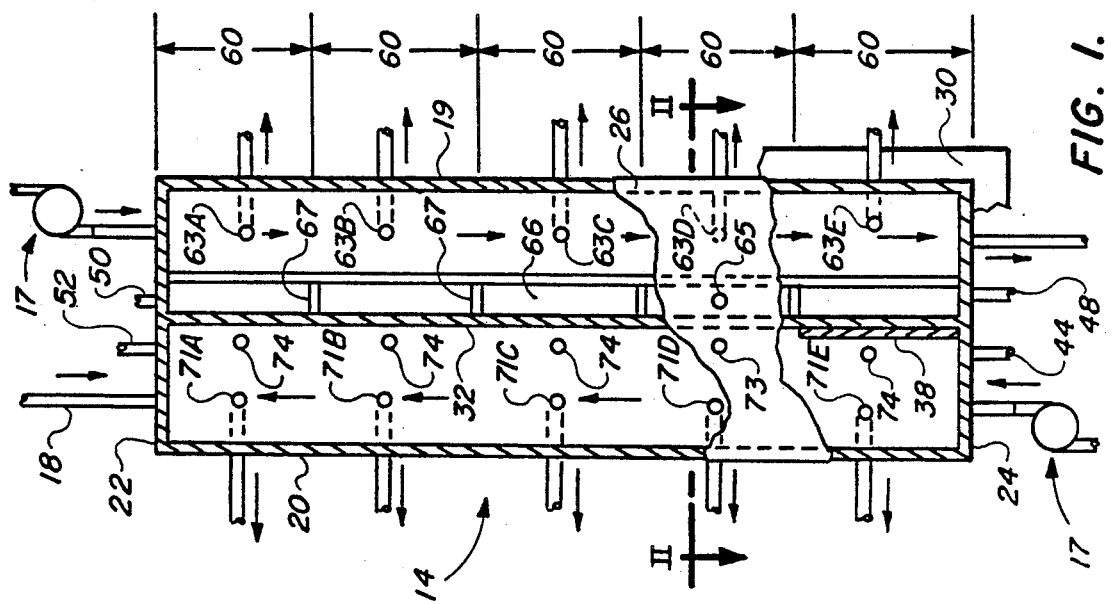
FIG. 1 is a plan view, with portions broken away, of a chamber paired device according to the present invention with gas movement shown schematically.

Referring now to FIGS. 1 and 2, the apparatus for simultaneous heat and mass transfer according to the present invention is shown and generally indicated by the numeral 14 along with gas movement units 17, with gas movement shown for therefor duct 18. Device 14 is shown as a rectangular parallelepiped having side walls 19 and 20, end walls 22 and 24, and top wall 26 and bottom wall 28 with these walls usually insulated with insulation 30. As schematically shown, partition 32 separates device 14 into a pair of chambers: chamber 34 and chamber 36. Partition 32 serves as a heat conducting surface and preferably is a mechanically coherent sheet selected from the group consisting of plastics, metals, inorganic glasses or their components. Insulation of a small portion of either side of partition 32 may be insulation 38.

Basins 40 and 42 are utilized for liquids present in respective chambers 34 and 36. Ports 48 and 50 are provided for liquid entry or exit from basin 40 and ports 44 and 52 are provided for basin 42. A heat exchange between basin and feed liquids is preferred to maximize energy efficiency of the device. With internal feed liquid heat exchange, for example, feed liquid may pass through conduit 46 which is shown located such that heat transfer may take place between the liquid contained therein and the liquids of basins 40 and 42.

Partition 32 may be wetted on side 56 facing chamber 34 and on side 58 facing chamber 36 by alternate apparatus that allow temperature variances of the wetting liquids and composition differences to be segmented along the partition. The preferred segmented wetting apparatus relies upon division of the partition length into many sectors indicated by the numeral 60 where the mixing of liquids between these sectors does not occur to any appreciable extent. Liquid 62 can be removed from basin 40 via port, shown generally by the numeral 63, and returned to the top of chamber 34 via pump 64 and port 65 where the liquid 62 is discharged to side 56 of partition 32 through distribution apparatus 66. The distribution apparatus 66 is shown here as a perforated plate in length equal to sector 60 and terminated by blockages 67. This distribution apparatus is preferred for narrow channel devices, for example, in chambers of up to 2 cm in width. A plurality of these pumping and distribution apparati, having their basin discharge ports 63 located as 63A through 63E centered within their sector 60, can provide a full partition wetting while maintaining liquid temperature and applicable concentration integrity through the length of basin 40. However, as flow of liquid 62 within basin 40 is possible, some migratory movement from inlet 48 to discharge 50 can occur or the migration can be in the opposite direction.

In the same manner, liquid 70 can be removed from basin 42 through port 71 and returned to the top of chamber 36 via pump 76 through port 73. Discharge on side 58 of partition 32 is through distribution apparatus 74 which is shown as a spray nozzle. The spray nozzle may be placed at other positions, for example upward spraying from the basin, and is preferred for wider channel devices. A plurality of these distribution apparati, each spraying a sector area with discharge ports 71A through 71E centered in their respective sectors 60, allow basin liquid integrity. As liquid 70 is not restricted, some migratory movement to discharge port 52 may take place.

Devices for moving gas through the chambers and appended to device 14 are provided by a gas movement unit 17 for channel 34 and a gas movement unit 17 for channel 36.

The gas entering chamber 34 may have a different or the same temperature as the gas entering chamber 36. However, the temperature of the gas stream within the initial portion of chamber 36 must be different from the temperature of the gas stream leaving chamber 34 to afford heat transfer through partition 32. For instance, if the gas streams are from the same gas source and unsaturated, then if one stream is saturated by wetting substances in the chamber and the second gas stream does not gain or lose vapor, the saturated gas will heat while the dry gas will cool. Further, if the gases have the same temperature and are saturated, then if one chamber contains a desiccant wetting substance removing vapor from the gas phase thereby causing the gas phase to heat, then a temperature differential is established between the chambers causing the warmer side to cool while heating the other gas stream. Lastly, if the two gas streams are of different temperatures then a temperature differential is established between chambers.

The invention, as so far described, is applicable to gas cooling and gas heating, wherein working fluids in the chambers include brines acting or not acting as desiccants and water acting as a saturant. Referring to FIG. 1 and to FIG. 2, in a gas cooling mode without humidity modification to the cooling gas, outside ambient air is brought into chamber 34 by gas movement unit 17 Throughout most of the chamber length, for example, sectors 60 identified as 63A through 63D, the air becomes cooler by surrendering sensible heat to a still cooler evaporation chamber 36 on the opposite side of partition 32. In basin 40, a liquid desiccant which does not migrate or migrates very slowly may be used as spray to induce heat transfer in chamber 34. Sector pumping of this liquid desiccant assists in minimizing liquid mixing, thus preserving the temperature profile of the desiccant in the chamber. The air stream, now cooled and generally unsaturated, can be optionally further cooled by adiabatic humidification within chamber 34 by water wetting of sector 60 location 63E, thereby utilizing insulating 38 or, in this or the other operating modes, in a separate chamber. The cold saturated air stream is injected into a living or storage space and, after absorbing heat, is ejected therefrom.

Another ambient air stream may be subject to cooling by adiabatic humidification within sector 60 location 71E or, in this or other operating modes, separately in any evaporative cooler. This second air stream, now cooler than its opposite counterpart, is caused to warm gradually throughout chamber 36 by the energy exchanged through partition 32 from cooling chamber 34. This temperature rise is minimized by segmented water wetting of chamber 36, thereby providing for evaporation from chamber 36 into the air stream and absorbing most of the energy conducted through partition 32. This evaporation water can have a migratory flow to prevent increases in its dissolved solids content and can, in this example, flow from port 52 to port 44 through partition 32. This air leaves chamber 36 higher in saturated temperature than just after its entry into chamber 36. In continued operation, if this exiting air is now adiabatically dehydrated with a desiccant, which may be in a separate chamber or in a chamber extension, its temperature will exceed ambient temperature thus being higher than when it entered chamber 36.

In a second cooling mode incorporating humidity modification, a liquid desiccant, which generally enters at port 48, flows in a migratory manner from sector to sector countercurrently to the air stream and exits with its absorbed water via port 63C, 63D, or 50. As the air moves through chamber 34, the air continues to cool and decrease its absolute and relative humidity in accordance with the liquid desiccant strength. In any sectors without liquid desiccant, air absolute humidity stays constant, while its relative humidity increases as the gas cools. Energy released by the condensation within this liquid desiccant is conducted through partition 32 causing additional evaporation within chamber 36. The air stream, now cooled and unsaturated, can be further cooled by adiabatic humidification and is then injected into the space. Another ambient air stream is processed, as described above, with segmented wetting applied throughout the length of chamber 36. This air leaves chamber 36 higher in wet bulb temperature than upon its entry into chamber 36. In an alternate mode of operation, if this exiting air is now adiabatically dehydrated with a liquid desiccant, its temperature will exceed ambient, thus acting as a gas heater.

Reconcentration of the liquid desiccants can take place by a liquid phase concentration apparatus and method of the present invention to be now described.

Referring now to FIG. 3, a plan view, similar to FIG. 1 displays an alternative embodiment of device 14 wherein adjacent chambers of the chamber pairs of multiple devices 14 are related by their liquid and gas streams. Three chamber pairs are shown, by way of illustration of the invention, although two or more pairs can be interconnected in practice. Corresponding chambers of the chamber pairs are shown as chambers 34, 134, and 234 and chambers 36, 136, and 236. The chambers of each chamber pair are separated by partitions 32, 132, and 232, respectively, partitions which are heat conducting and each chamber pair is separated from other chamber pairs by insulation 30.

Auxiliary heat exchange unit 15 can be any supply or device that causes the saturated temperature of the gas stream within the initial portion of chamber 36 to be greater than the saturated temperature of the gas stream leaving chamber 34. Auxiliary heat exchange unit, shown as chamber 76, can have sectors 60 of device 14 and contains a partition 80 which serves as a heat conducting surface similar to partition 32. Heat transferred through partition 80 into chamber 76 may be from any source. As examples, sources can include direct heating by coils or solar energy or by transfer of heat from steam, gas, or liquid stream.

Apparatus for cooling the inlet gas introduced into chamber 234 can be provided by optional supplemental gas cooler 16 where the gas stream passes through chamber 78. Supplemental gas cooler 16 contains a partition 80 with heat transferred from chamber 78 to any heat sink, such as an adiabatically chilled ambient air stream or other gas or liquid streams.

Multiple devices 14, auxiliary heat exchange unit 15, and optional supplemental cooler 16 are interconnected by liquid movement and gas movement. For liquid movement, two ports generally are provided per chamber for devices 14 and are shown as 48 and 50 for corresponding chambers 34, 134, and 234. For corresponding chambers 36, 136, and 236, these ports are shown by the numerals 44 and 52 for each identified chamber. Chamber 76 of auxiliary heat exchange unit 15 has associated therewith ports 48 and 50, while optional supplemental gas cooler 16 contains port 52. Two liquid streams are utilized. One liquid stream is generally for feed liquids, connecting port 50 of auxiliary heat exchange unit 15 via pipe 90 to port 48 of chamber 34. Liquid exit from this chamber is by means of port 50 which in turn is connected by pipe 91 to port 48 of chamber 134. Liquid exits from the chamber by port 50 and flows through pipe 92 to port 48 of chamber 234. Feed liquid exit from chamber 234 and from the process is provided by outlet 50. In some applications, this liquid flow may be reversed, for example, when using a weak feed liquid which, when further concentrated, does not significantly alter the vapor pressure of the evaporating fluid. The other liquid stream, generally for condensate liquids, flows from port 52 of chamber 36, by means of pipe 93, to port 44 of chamber 136 and exits this chamber by means of port 52. Port 52 connects to chamber 236 by pipe 94 and port 44. Liquid exit from chamber 236 and the process is through port 52. Liquid removal from chamber 78 of supplemental cooler 16, which generally is a separate liquid stream, is by means of a port 52. Gas movement for the multiple gas streams is by multiple gas movement units 17; wherein gas movement units 17, with ducts 18, cause distinct gas loops to be developed with flow directions as indicated by arrows. The first gas stream recirculates through chamber 76 of auxiliary heat exchanger 15 and chamber 36 of a device 14. Now, involving only devices 14, the second gas stream flows through chambers 34 and 136, while the third gas stream recirculates through chambers 134 and 236. The fourth gas stream flows through chamber 234 and exits to the atmosphere or, optionally, circulates through a supplemental cooling unit 16 and reenters chamber 234.

The invention is applicable to liquid phase concentrating, crystallizing or purifying wherein, for example, a salt solution can be further concentrated to a brine or mostly crystalline condition while obtaining a substantially pure distillate. In operation as shown in FIG. 3, a heat source such as auxiliary heat exchange unit 15 is coupled to multiple chamber pairs, shown as multiple devices 14, and then to an optional supplemental gas cooler 16 in a manner such that high temperature energy transferred through partition 80 of auxiliary heat exchange unit 15 is likewise transferred through partitions 32, 132, and 232 at progressively lower temperatures. Low temperature energy leaving chamber 234 in the exiting gas stream is either ejected into the atmosphere as exhaust gas and replaced by atmospheric gas introduced into chamber 234 or, the low energy is recirculated after cooling in supplemental gas cooler 16 with heat exchange through partition 80 by conduction to a cooler environment. This high to low temperature gradient is established through the set of chamber pairs to allow energy to flow from hot to cold. Also, as in the previously described unit 14, another temperature gradient is established in each chamber of all chamber pairs as gas flows from one end to the other end of a chamber. The chambers that heat a gas by energy from a partition cause evaporation of liquid, while chambers that cool a gas by energy removal through a partition cause condensation of pure liquids.

In more detail, gas is moved by a gas movement unit 17 into chamber 76 of auxiliary heat exchanger unit 15 where energy from any heat source passes through partition 80, heating and causing evaporation to the gas to produce higher energy gas. Feed liquids for saturating this gas by evaporation can be supplied to auxiliary heat exchange unit 15 via port 48.

The high energy gas exiting chamber 76 flows to chamber 36 of a first chamber pair where it is cooled while forming condensate. The high energy gas exits chamber 36 as lower energy gas to be recycled to auxiliary heater unit 15 by a gas movement device 17. The condensation energy is transmitted from chamber 36 to chamber 34 through partition 32. Gas exiting chamber 136, which is cooler than exiting chamber 36 gas, is brought into chamber 34 along with unevaporated feed liquid from port 50 of chamber 76 to port 48 of chamber 34. The gas in chamber 34 and the feed liquids move countercurrent to each other as heat enters from partition 32. The entering heat causes the gas in chamber 34 to warm and evaporate water from the feed liquid, thereby reusing the energy that was initially supplied by partition 80. Hot saturated gas leaves chamber 34 and is recycled to chamber 136 of a second chamber pair where the vapor is condensed and heat is transferred through partition 132 into chamber 134. Condensate exiting chamber 34 at port 52 flows to port 44 of chamber 136, while all unevaporated feed liquid leaves chamber 34 by port 50 and enters chamber 134 via port 48. Partition 132 transmits essentially the same amount of heat that was transmitted through partition 80 of auxiliary heat exchange unit 15 and partition 32 between chambers 34 and 36. The heat transferred into chamber 76 is thereby used for a third time to evaporate water from the feed liquid. Gas from chamber 236 of a last chamber pair, gas which is cooler than exiting gas from chamber 136, is moved by a gas movement device 17 to enter chamber 134, thereby heating and evaporating feed liquids. Exiting gas from chamber 134 is recycled by a gas movement unit 17 to chamber 236. Condensate, from chambers 36 and 136, now exiting chamber 136 flows to chamber 236 and unevaporated feed liquids move from chamber 134 to chamber 234, generally using gravity flow. Low energy gas from an ambient source or from a supplemental cooling unit 16 is sent to chamber 234 by means of another gas movement device 17 where its temperature is less than the temperature of gas leaving chamber 236. Therefore, the gas stream in chamber 236 loses energy through partition 232 to the gas stream in chamber 234. This heat causes the gas in chambers 234 to heat and evaporate water from the feed liquids present in chamber 234 resulting once again in reusing the energy from partition 80 of auxiliary heat exchange unit 15 to evaporate water. Gas from chamber 234 can be discharged to the atmosphere or sent to chamber 78 of supplemental cooler 16. Condensate from port 52 of chamber 236 exits the process and the unevaporated, but more highly concentrated, feed liquids exit the process from port 50 of chamber 234. Any condensate formed in supplemental cooler unit 16 exits the process at its port 52.

In this example the energy supplied to auxiliary heat exchanger 15 was reused approximately four times to evaporate water from a feed liquid. If more chamber pairs were employed, the number of times the energy can be reused will increase. Additionally, to improve further energy reuse, an internal feed/condensate/concentrate heat exchange may be employed as shown in FIG. 2. For example, an initially cool feed liquid may flow inside conduit 46 white both condensate and warmer unevaporated feed liquids flow on either side in their appropriate basins.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for changing at least one selected property of two wetting substances, said apparatus comprising:

a first chamber containing a plurality of sectors;

first wetting means for segmentedly wetting substantially all of said sectors with a first substance;

migration means coupled to said first wetting means for providing a migratory movement for said first substance between adjacent sectors;

a second chamber containing a second plurality of sectors;

second wetting means for segmentedly wetting substantially all of said sectors of said second chamber with a second substance;

a heat transferring partition thermally connecting said first and second chambers, wherein sectors in said first chamber and said second sector are bounded by said heat transferring partition;

first gas flow means controlling a flow of a first gas through said first chamber; and second gas flow means controlling a flow of a second gas through said second chamber, said first gas and said second gas being substantially independent, said gas flow in said first chamber being a generally opposite direction from said gas flow in said second chamber, wherein temperatures and humidities of said first gas and said second gas when entering said first and second chambers interacting with said wetting substances allow a temperature of said first gas exiting said first chamber to be different from a temperature of said second gas entering said sectors of said second chamber, said changing of temperature resulting in transfer of heat between said first and second chambers through said partition between said first substance and said second substance, wherein temperatures of said first substance and temperatures of said second substance are respectively below a boiling temperature for each substance during substance wetting, wherein interaction in said sectors between said substances and said gas causes a change in at least one selected property of said first and second substances, said gas approaching a vapor-liquid equilibrium with said substances for each of said wetted sectors, wherein interaction by said first substance and said migratory movement causes said selected property of said first substance of a sector to influence said selected property of said first substance in an adjacent sector.

2. The apparatus for changing at least one selected property of claim 1 wherein said selected property is a substance temperature.

3. The apparatus of claim 1 wherein said selected property is a substance composition.

4. The apparatus for changing at least one selected property of claim 1 further comprising a second migration means coupled to said second wetting means for providing a second migratory movement of said second substance, wherein interaction between said second substance and said second migratory movement causes a selected property of said second substance of a sector to influence said selected second substance property in an adjacent sector.

5. An apparatus for heat and mass transfer comprising:
- a chamber pair with a heat transferring partition;
- a first chamber of said chamber pair with a first surface of said partition as a first chamber boundary;
- a second chamber of said chamber pair with a second surface of said partition as a second chamber boundary, said second chamber thermally coupled to said first chamber by said heat transferring partition;
- first wetting means for segmented wetting of at least part of said first surfaces by a first wetting substance;
- second wetting means for segmented wetting of at least part of said second surfaces by a second wetting substance;
- migratory flow means coupled to said second wetting means for providing a migratory flow of said second wetting substance;
- multiple gas means for regulating flow of gases causing a first gas to flow through said first chamber of said chamber pair and a second gas to flow through said second chamber of said chamber pair, said first and said second gas being substantially independent, wherein said first and second gas flow in each said chamber pair is countercurrent across said partition wherein temperatures and humidities of said gases interacting with said wetting substances cause a temperature difference between said first and said second chambers permitting heat transfer between said first wetting substance and said second wetting substance through said heating transferring partition and mass transfer between said first wetting substance and said first gas flowing in said first chamber and between said second wetting substance and said second gas flowing in said second chamber, wherein said gases approach a vapor-liquid equilibrium with each wetting substance in each segment of said segmentedly wetting surfaces.

6. An apparatus for heat and mass transfer comprising:
- a series of at least two chamber pairs each with a heat transferring partition;
- a first chamber of each said chamber pair with a first surface of said partition as a first chamber boundary;
- a second chamber of each said chamber pair with a second surface of said partition as a second chamber boundary, said second chamber thermally coupled to said first chamber by said heat transferring partition;
- first wetting means for segmented wetting of at least part of said first surfaces by a first wetting substance;
- second wetting means for segmented wetting of at least part of said second surfaces by a second wetting substance;
- migratory flow means coupled to said second wetting means for providing a migratory flow of said second wetting substance;
- multiple gas means for regulating a flow of gases causing a gas to flow through said first chamber of said first chamber pair, a gas to flow in said second chamber of said first chamber pair and in said first chamber of said second chamber pair, a gas to flow in said second chamber of a last said chamber pair, wherein said gas flow in each said chamber pair is countercurrent across said partition; and
- thermal means for changing a temperature of said gas flowing through said first chamber of said first chamber pair, said thermal means causing a temperature difference between all said first and said second chambers permitting heat transfer between said first wetting substance and said second wetting substance through said heat transferring partitions and mass transfer between said first wetting substance and said gases flowing in said first chambers and between said second wetting substance and said gases flowing in said second chambers, wherein a temperature gradient is established between said chamber pairs and the temperatures within a chamber are different from one end to the other, wherein said gases approach a vapor-liquid equilibrium with each wetting substance in each segment of said segmentedly wetted surfaces, a heat provided by said thermal means being approximately equal to a heat transferred through each said partition.

7. Apparatus for heat and mass transfer of claim 6 further comprising a second migratory flow coupled to said first wetting means for providing a migratory flow of said first wetting substance.

8. Apparatus for heat and mass transfer of claim 6 further comprising auxiliary heat exchange means containing a chamber with heat exchange partition, wetting means for segmented wetting and migratory flow coupled to said wetting means, said auxiliary heat exchange means receiving gas by said gas means providing gas flow to said first chamber of said first chamber pair, said gas flow then returned to said auxiliary heat exchange means.

9. Apparatus for heat and mass transfer of claim 6 further comprising a cooling means for cooling said gas of said second chamber of said last chamber pair where said gas is returned to said second chamber.

* * * * *